United States Patent [19]

Stocks

[11] 4,254,897
[45] Mar. 10, 1981

[54] SEED AND FERTILIZER METERING MECHANISM FOR AGRICULTURAL DRILLING MACHINES

[75] Inventor: Richard A. Stocks, Holbeach, England

[73] Assignee: Hestair Bettinson Limited, Cambridgeshire, England

[21] Appl. No.: 15,012

[22] Filed: Feb. 26, 1979

Related U.S. Application Data

[63] Continuation of Ser. No. 790,607, Apr. 25, 1977, abandoned, which is a continuation of Ser. No. 617,797, Sep. 29, 1975, abandoned.

[30] Foreign Application Priority Data

Sep. 27, 1974 [GB] United Kingdom ............... 42023/74

[51] Int. Cl.$^3$ ............................................... B67D 5/38
[52] U.S. Cl. ..................................... 222/159; 111/34; 222/274; 222/407; 222/414; 222/623
[58] Field of Search ............... 222/158, 159, 267, 273, 222/274, 312–316, 406, 410, 414, 185, 280, 412, 613, 623–625, DIG. 1, 310–311; 221/241, 260, 277; 111/34

[56] References Cited

U.S. PATENT DOCUMENTS

| 266,805 | 10/1882 | Getz | 222/159 |
|---|---|---|---|
| 969,918 | 9/1910 | Streitz | 222/274 X |
| 1,329,597 | 2/1920 | Harrls | 222/273 |
| 2,237,504 | 4/1941 | Roath | 222/314 X |
| 2,605,935 | 8/1952 | Huitema | 222/410 X |
| 3,391,831 | 7/1968 | Wolf | 222/159 X |
| 3,872,837 | 3/1975 | Rogers | 222/414 X |
| 3,999,690 | 12/1976 | Deckler | 222/410 X |
| 4,002,266 | 1/1977 | Beebe | 221/260 |

Primary Examiner—Stanley H. Tollberg
Assistant Examiner—Fred A. Silverberg
Attorney, Agent, or Firm—Pollock, VandeSande and Priddy

[57] ABSTRACT

A device for discharging particulate material, such as agricultural seed at a uniform rate comprises a hopper having a rectangular slot in the base, a driven roller having a compressible surface which contacts one side of the slot and a transparent glass metering plate attached to the hopper and which bears against the roller to provide a nip therebetween and to control the rate of flow of the material from the hopper while allowing visual examination of the flow of particulate materials between the roller and metering plate. The device may be conveniently attached to an agricultural drilling machine and the roller driven by a mechanism associated with the ground wheels of the machine. Collecting cups are provided for directing the seed from beneath the roller into the seed drills. Seed is discharged into the drills at a constant rate and no adjustment is necessary for use with seeds of different sizes. The metering plate may be replaced by an edge which is adjustable to provide a metering gap between the edge and the roller the size of which is related to the size of the seed to be discharged.

2 Claims, 6 Drawing Figures

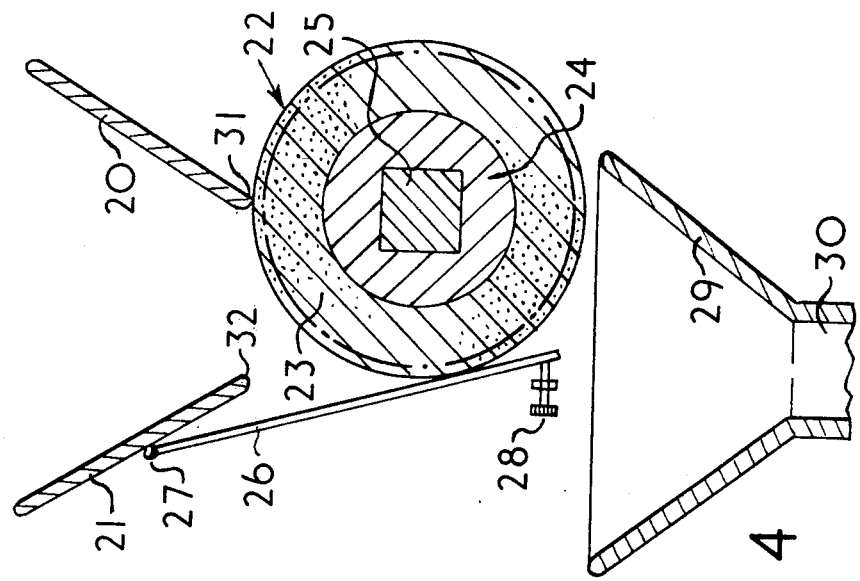
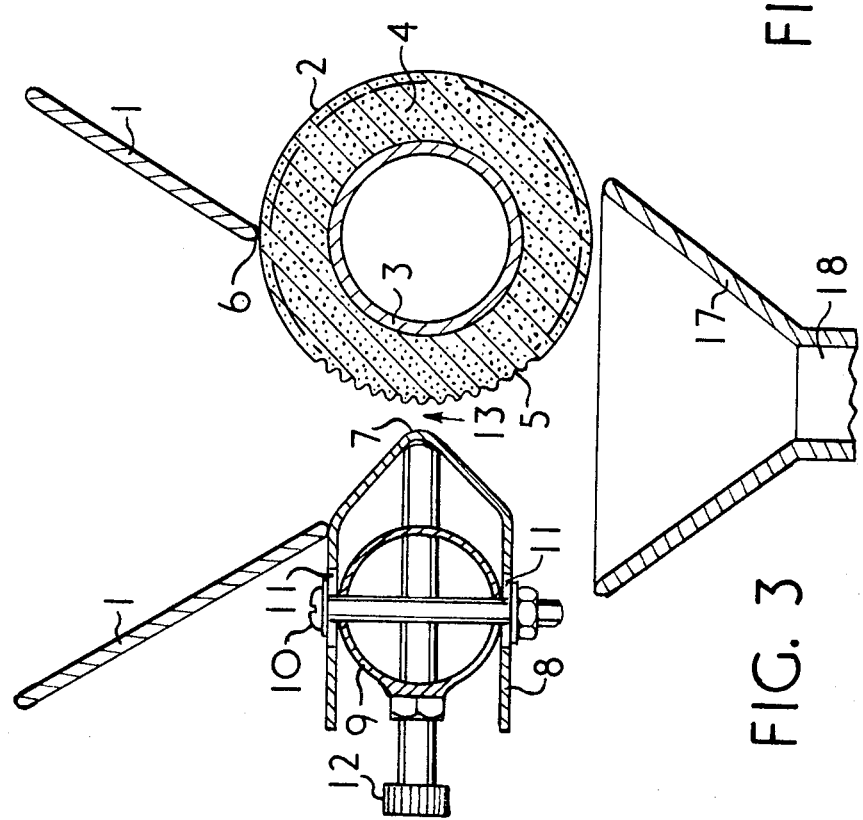
FIG. 3
FIG. 4

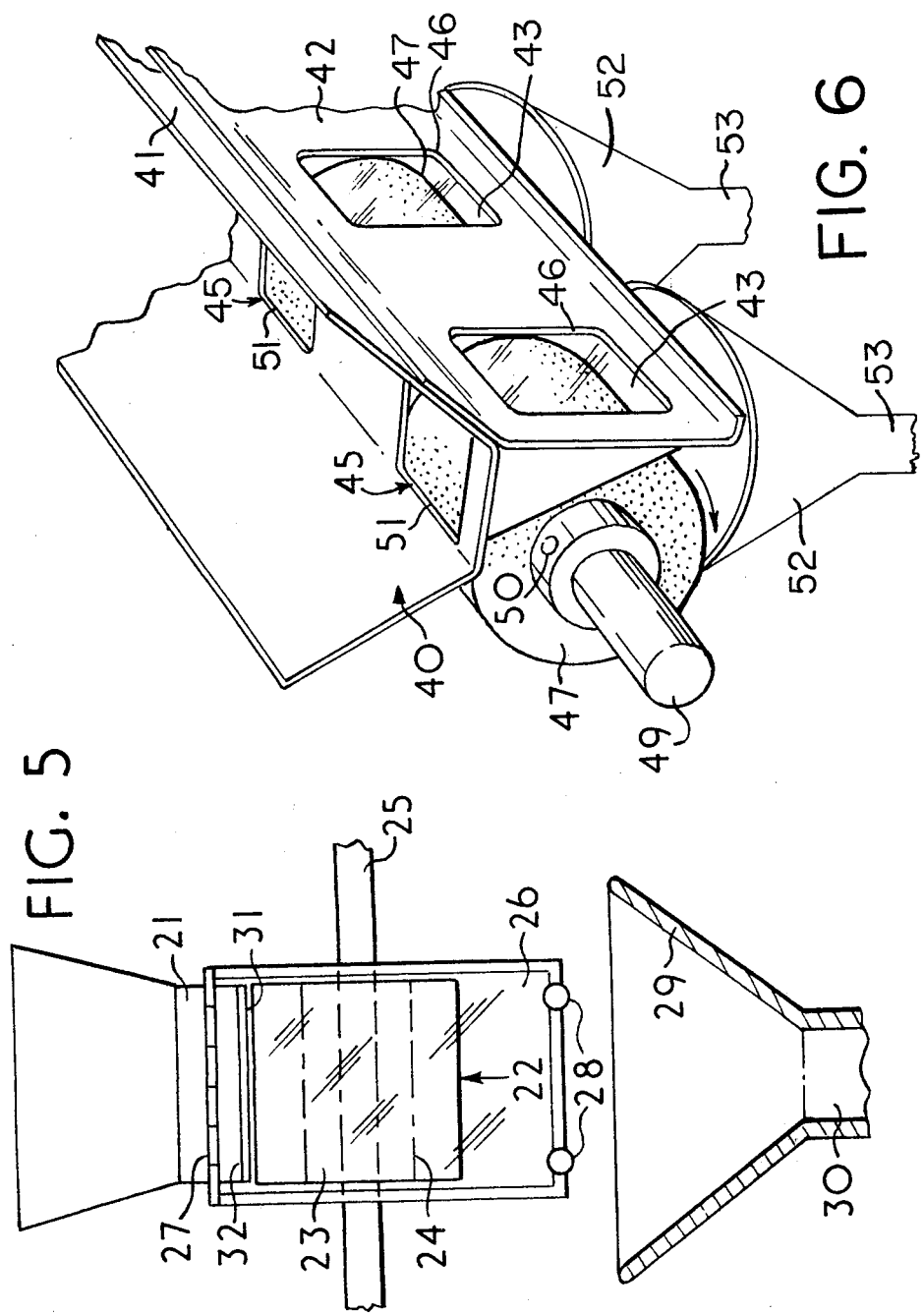

SEED AND FERTILIZER METERING MECHANISM FOR AGRICULTURAL DRILLING MACHINES

This is a continuation of application Ser. No. 790,607, filed Apr. 25, 1977, now abandoned, which is a continuation of application Ser. No. 617,797, filed Sept. 29, 1975, now abandoned.

BACKGROUND OF THE INVENTION

This invention relates to means for metering particular material and is particularly, but not exclusively, concerned with means for metering agricultural seed and/or fertilizer from the hopper of a seed and fertilizer drilling apparatus.

Agricultural seed and fertilizer drilling apparatus is known which comprises a hopper mounted on a wheeled support and wherein the floor of this hopper defines an exit which is closed by a pair of contrarotatable rollers each of which is covered with a layer of compressible foraminous material providing a nip therebetween through which the seed and/or fertilizer may be discharged from the hopper at a controlled rate. Apparatus of this kind, however, may have certain disadvantages in use. Thus, for example, the rollers may be subject to shrinkage or wear in use and this can lead to variability of throughput over a period of use. In order to compensate for this shrinkage and/or wear of the rollers, a complicated mechanism of roller adjustment is required.

SUMMARY OF THE INVENTION

The present invention provides an improved device for discharging seed and fertilizer from the hopper of an agricultural apparatus for the discharge of seed or particular fertilizer.

Accordingly, therefore from one aspect the present invention provides a device for discharging particulate material from a container having an exit opening, said means comprising a rotatable roller having a compressible surface and a metering means, said roller and metering means cooperating with the container to seal the said exit opening thereof when the roller is stationery, the width of said exit of the container being no greater than the length of the roller, and means to rotate the roller.

Preferably the exit opening of the container is in the form of a rectangular slot having at least one straight edge. Preferably also the roller is so positioned that its surface is adjacent to the said edge and most preferably bears it against it to provide a seal.

The container may be the hopper of an agricultural seed and/or fertilizer drilling apparatus and the particulate material may be agricultural seed or particulate fertilizer. Conveniently, the exit opening of the hopper may be formed in the floor thereof.

The present invention also includes an agricultural seed and/or fertilizer drilling apparatus including the device for metering seed and/or fertilizer as defined above.

The metering means is preferably a plate which bears against the roller at a point below the level of the exit opening from the container, one end of said metering plate hingedly cooperating with the container or an edge of the exit opening thereof to effect a seal between the metering plate and container. Adjusting means may be provided at the other end of the metering plate to vary the pressure at which the said plate bears against the roller.

Conveniently, the metering plate may be metal, plastic or transparent glass, the latter being particularly suitable since it allows visual examination of the flow of particulate materials between the roller and plate when in use.

The metering means may also be in the form of an edge which cooperates with a second edge of the exit opening from the container and the roller to provide seals therebetween. Means may be provided to adjust and releasably secure the metering edge relative to the roller to define a gap between the roller and the metering edge through which the particulate material is discharged.

Preferably the metering edge is adjustable relative to the roller by rotation about an axis parallel to the longitudinal axis of the roller, to provide a number of differently sized gaps between the roller and metering edge. A gap of say 0.01 to 0.02 inches is suitable for small seeds such as kale or mustard, a gap of about 0.08 inches is suitable for certain materials such as wheat or barley and a gap of about 0.125 inches for larger seeds such as peas or beans.

The compressible surface of the roller may be formed from any suitable material such as, for example sponge neoprene, a plastics foam such as a polyurethane, preferably having a smooth surface to eliminate the possibility of carry-through of fine seeds on the roller, or it may be an inflatable material. The surface of the roller may be smooth when employed with a metering plate, but is preferably roughened or corrugated by grooving when a metering edge is used to provide a more positive feed to the gap between the edge and the roller.

The rate of discharge of the particulate material is determined for any given size particle by the speed of rotation of the roller. When employed for discharging agricultural seed, the speed of rotation of the roller may be conveniently controlled by deriving power from the ground wheels of the seed drill via a suitable gearbox.

Most surprisingly, it has been found that, when employed for discharging agricultural seed and using a metering plate, effective metering is achieved without adjustment of the position of the metering plate relative to the roller regardless of the type of seed to be discharged. Thus grass, barley and beans, for example, can be discharged in succession without need for adjustment of the metering plate. A further surprising feature is that the seed passes between the metering plate and the roller at 1 seed thickness, resulting in a particularly uniform discharge of seed into the seed drill.

When using a metering edge, the gap between the edge and roller is chosen so that it is narrow enough to prevent run-through of the material to be discharged from the hopper when the roller is stationary, but sufficiently large to ensure the minimum amount of compression of the roller to feed the material through. Although it is possible to make this mechanism work with a relatively smooth surface on the roller a problem can arise when foreign matter such as, for example, small stones, is inadvertently added to the material in the hopper, this being quite possible bearing in mind the working conditions under which the apparatus is used. Thus for example dirt and stones may fall into the hopper from the boots of an operator who is standing on the hopper to empty sacks of seed or fertilizer into the hopper. With a relatively smooth surfaced roller, the foreign matter is not passed through the gap, and is rolled about, and eventually could cause damage to the roller. When a roller with a roughened or corrugated surface is used however the roller grips the foreign matter and feeds it through the gap without causing damage.

BRIEF DESCRIPTION OF THE DRAWINGS

In order that the invention may be more clearly understood, three embodiments thereof will now be described with the aid of the accompanying drawings, which are diagrammatic only, in which:

FIG. 3 is a vertical section through part of an argicultural seed and fertilizer drilling apparatus according to the embodiment of the invention described with reference to FIGS. 1 and 2 in the region of the roller and the metering edge;

FIG. 4 is a vertical section through a part of an agricultural seed and fertilizer apparatus of a second preferred embodiment of the invention employing a glass metering plate;

FIG. 5 is a front view of the section shown in FIG. 4; and

FIG. 6 is a perspective view of a modified form of the embodiment of FIGS. 4 and 5.

DESCRIPTION OF THE PREFERRED EMBODIMENTS

Figure 1:
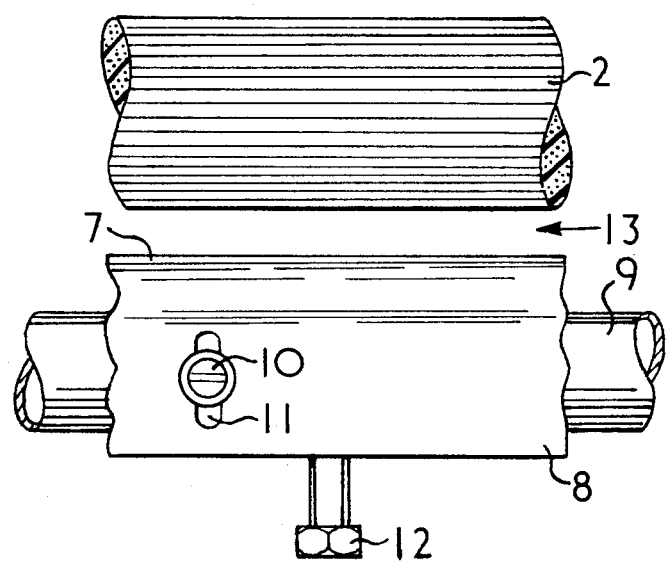
FIG. 1 is a view of one embodiment of the invention employing a metering edge showing the relationship between the roller and the metering edge, as seen from above.
Figure 2:
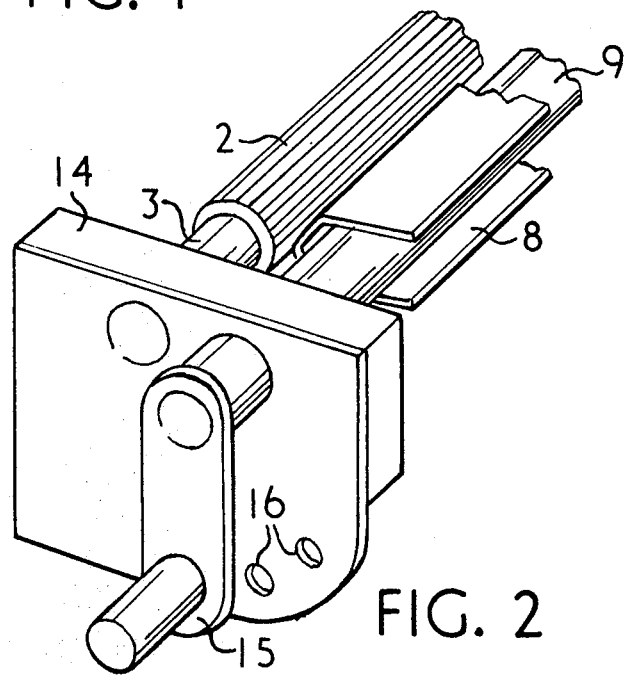
FIG. 2 is a perspective view of the end of the roller and metering edge of FIG. 1 showing the means for adjustment of the latter.

Referring to FIGS. 1, 2 and 3, are agricultural seed and fertilizer drilling apparatus includes a hopper for seed or fertilizer mounted on a wheeled frame (not shown). The front and rear walls of the hopper 1,1 slope towards each other near the bottom of the hopper and together with the vertical end walls define an elongate rectangular exit opening in the floor of the hopper. Positioned along the length of the exit opening and to one side of the center line thereof, is a roller 2 comprising a metal support 3 and a covering of compressible foraminous rubber 4. The surface of the roller 2 is grooved longitudinally, the depth of each groove 5 being of the order of 0.125 inches. The roller 2 is mounted so that the lower edge of the adjacent wall 1 of the hopper touches the roller 2 at a point 6 vertically above the axis of rotation of the roller providing a seal to prevent the egress of seed or fertilizer from the hopper at that point.

A metering edge 7 situated opposite the roller 2 along the other side of the hopper exit is provided with a smooth surfaced metal plate folded along its length to form an element 8 of substantially U-shaped section, mounted on a bar 9, and releasably fixed thereon by locking bolts 10 situated at intervals along the length of the bar 9. The locking bolts 10 pass through slots 11 in the element 8, and are situated at right angles to adjusting bolts 12, also located at intervals along the length of the bar 9. The combined operation of the locking bolts 10 and the adjusting bolts 12 may be used to adjust the gap 13 provided between the metering edge 7 and the roller 2 to compensate for wear and/or shrinkage of the latter over a period of time. The top of the element 8 abuts the adjacent hopper wall 1 to provide a seal to prevent the egress of seed or fertilizer therebetween.

The opposing ends of the roller support 3 and of the metering edge support bar 9 are journalled into mountings 14 attached to the frame supporting the hopper as shown in FIG. 2. One end of roller support 3 is modified to cooperate with a roller driving means (not shown) deriving power via a gear box from the rotation of the ground wheels supporting the apparatus. The end of the metering edge support bar 9 shown in FIG. 2 protrudes beyond the mounting 14 and is provided with a lever 15 and spring-assisted pin which locates in one of a number of alternative holes 16 provided in the mounting, this arrangement providing a corresponding number of different sized gaps between the metering edge 7 and the roller 2 so that the apparatus can cope with different sizes of seed.

As shown in FIG. 3, a number of collecting cups 17 are located underneath the gap to catch the seed or fertilizer as it is fed through the gap 13 between the roller 2 and the metering edge 7. The seed or fertilizer is then led through conduits 18 from the collecting cups 17 and discharged from the other end of the conduits 18 to the ground, which may be tilled of otherwise prepared to receive the seed or fertilizer by the operation of tines or discs or other soil-working members also attached to this apparatus.

Referring to FIGS. 4 and 5, an agricultural seed and fertilizer drilling apparatus includes a hopper for seed or fertilizer mounted on a wheel frame (not shown). The front and rear walls 21, 20 of the hopper slope towards each other near the bottom of the hopper, and their bottom edges 32, 31 together with the vertical end walls of the hopper define an elongate rectangular exit opening in the floor of the hopper. Positioned along the length of the exit opening, and to one side of the center line thereof, is a roller 22 comprising a mandrel 24 covered with a compressible sponge neoprene rubber 23. Conveniently the roller 22, and therefor the exit opening of the hopper, may be 4 inches long, the diameter of the mandrel 1½ inches, and the total diameter of the roller 4 inches.

The roller 22 is mounted on a square drive shaft 25 so that the lower edge 31 of the adjacent wall 20 of the hopper touches the surface of roller 22 at a point vertically above the axis of rotation of the roller providing a seal to prevent the egress of seed or fertilizer from the hopper at that point.

A transparent glass metering plate 26 extending the full length of the roller 22 is hingedly connected at 27 to the front wall of the hopper 21 to allow visual examination of the flow of materials between the roller 22 and plate 26, and said glass plate extends below the level of the roller bearing thereagainst under the influence of the adjustment means 28. The latter adjustment means can be employed to vary the pressure at which the glass metering plate 26 bears against the roller 22.

A collecting cup 29 is located beneath the roller 22 to collect seed or fertilizer as it is fed between the roller 22 and glass metering plate 26. The seed or fertilizer is then led through conduits 30 and discharged from the other end to the ground as in the previously described embodiment.

As in the previously described embodiment each end of the drive shaft 25 is journalled into mountings attached to the frame supporting the hopper. One end of the drive shaft is modified to cooperate with a roller driving means deriving power via a gear box from the rotation of the ground wheels supporting the apparatus.

With the hopper containing seed, the latter is discharged into the cups 29 at a uniform rate dependent upon the speed of rotation of the roller 22. As previously indicated, the seed passes between the roller 22 and the glass metering plate 26 in a single seed thickness regardless of the seed size, the seed visually appearing to pass between the metering plate 26 and roller 22 as a continuous sheet of seeds. It will thus be readily appreciated that this embodiment may be conveniently modified to permit precision planting of seeds such as beans.

In the embodiment illustrated in FIG. 6 a vertical steel metering plate holder 42 is attached to the front side 41 of hopper 40. A plurality of rectangular exit openings 45 are provided in the bottom of the hopper 40 and a corresponding plurality of rectangular windows 46, one for each exit opening 45, are formed in metering plate holder 42. Each window 46 has its own transparent glass metering plate 43 mounted in a vertical attitude on plate holder 42 so as to close the window.

A plurality of individual sponge covered metering rollers 47, one for each of said exit openings 45, are mounted on a common drive shaft 49 and keyed thereto by respective pins 50. The rollers 47 are mounted so that each roller sealingly engages the rear edge 51 of its respective exit opening 45 and so that its glass metering plate 43 bears against the roller in substantially tangential relationship with the roller. Each roller 47 in combination with its glass metering plate 43 defines a downwardly tapering nip which communicates directly through its respective exit opening 45 with hopper 40, and the nip is therefore filled with seed during use. A series of collecting cups 52 and associated conduits 53 are positioned below the rollers 47 of the metering mechanisms to receive each of the metered flows of seed from the hopper and to deliver said metered flows to the ground.

In use, hopper 40 is filled with seed and the seed also fills the downwardly tapering nips between the glass metering plates 43 and rollers 47. The rollers 47 touch their respective metering plates 43 and thereby prevent any flow of seed into cups 52 and conduits 53 except when the rollers are rotated during seeding. Upon rotation of the rollers 47 in the direction indicated, the layer of seed in contact with each roller surface is frictionally fed downwards into and through the nip between the roller and its metering plate 43. As each seed makes contact with its metering plate 43 it is squeezed into the compressible surface of the roller and thereby gently gripped as it is taken through the apex of the nip as part of the layer of seed. On emerging on the other side of the nip the compression applied to the seeds is released and the roller returns to its undeformed shape, thereby releasing the seeds which drop into collecting cups 52 and pass through conduits 53 to the ground. Windows 46 and transparent glass metering plates 43 permit visual monitoring from the front side of the hopper of the flow of seed between each glass metering plate and its respective metering roller during the seeding operation.

The rollers can be readily replaced by new ones machined to the same size as soon as any wear becomes apparent.

Although the embodiments described above show the rear wall of the hopper in contact with the surface of the roller, this is not essential to the operation of the apparatus. A small gap between the roller and the hopper is permissible providing that it is sufficiently small to prevent the passage of seed therethrough when the apparatus is either stationery or in use. Neither is it necessary that the lower edge of the wall 20 of the hopper be vertically above the axis of rotation of the roller; the roller may be mounted slightly backwards and upwards of the position shown in the drawing so that the lower edge of the wall 20 is below the level of the top of the roller surface. In this latter circumference a somewhat wider gap between the edge of the wall 20 and the roller 22 may be permissible.

It will be appreciated from the foregoing that the exit from the hopper may be in the front face thereof.

I claim:

1. An agricultural drilling machine comprising:
   a hopper for seed and/or fertilizer, said hopper having downwardly-converging front and rear walls and a bottom portion which defines a plurality of exit openings spaced from one another lengthwise of said hopper through which seed or fertilizer to be drilled by said machine can flow;
   a plurality of metering mechanisms, one for each of said exit openings respectively, to provide a metered flow of seed or fertilizer from said hopper through each of said exit openings; and
   collecting cups and associated conduits positioned below said plurality of metering mechanisms to receive each of said metered flows of seed or fertilizer and to deliver said metered flows to the ground prepared by said soil-working members;
   each of said metering mechanisms comprising:
   a rotatable metering roller connectable to a drive and mounted below its respective exit opening of said hopper, said metering roller having a compressible surface portion;
   a flat glass metering plate; and
   a holder for said metering plate connected to the front side of said hopper and extending generally vertically from said hopper to a position below said respective exit opening, said glass metering plate being fixed to said holder in a substantially vertical attitude adjacent to the compressible surface of its respective metering roller at a position forward of and below its said respective exit opening of said hopper, and said glass metering plate being positioned in substantially tangential relation to and bearing against the compressible surface of its respective metering roller so as to define therewith a downwardly tapering nip having unobstructed communication with said hopper through said exit opening, the direction of rotation of said metering roller by said drive during use being such that seed or fertilizer in said nip is fed by said metering roller through said nip and past said glass metering plate for discharge downwardly to said collecting cups and conduits while said glass metering plate permits visual monitoring from the front side of said hopper through said glass metering plate of the flow of speed or fertilizer between the said glass metering plate and its respective metering roller.

2. The agricultural drilling machine of claim 1 wherein said rotatable metering rollers are mounted in side-by-side relation to one another on a common drive shaft.

* * * * *